United States Patent [19]
Morten et al.

(10) Patent No.: US 10,929,748 B1
(45) Date of Patent: Feb. 23, 2021

(54) SYSTEMS AND METHODS FOR IMPLEMENTING OPERATIONAL TRANSFORMATIONS FOR RESTRICTED COMPUTATIONS OF A MIXED-SIGNAL INTEGRATED CIRCUIT

(71) Applicant: Mythic, Inc., Austin, TX (US)

(72) Inventors: Andrew Morten, Cupertino, CA (US); Eric Stotzer, Austin, TX (US); Pei-Ci Wu, Millbrae, CA (US); Michail Tzoufras, Austin, TX (US); David Fick, Cedar Park, TX (US)

(73) Assignee: Mythic, Inc., Austin, TX (US)

( * ) Notice: Subject to any disclaimer, the term of this patent is extended or adjusted under 35 U.S.C. 154(b) by 0 days.

(21) Appl. No.: 17/060,338

(22) Filed: Oct. 1, 2020

Related U.S. Application Data

(60) Provisional application No. 62/990,701, filed on Mar. 17, 2020, provisional application No. 62/978,910, (Continued)

(51) Int. Cl.
*G06N 3/063* (2006.01)
*G06N 3/04* (2006.01)
(Continued)

(52) U.S. Cl.
CPC ......... *G06N 3/0635* (2013.01); *G06F 9/5027* (2013.01); *G06K 9/6296* (2013.01); *G06N 3/0481* (2013.01); *G06N 3/08* (2013.01)

(58) Field of Classification Search
CPC .................................................. G06N 3/0635
See application file for complete search history.

(56) References Cited

U.S. PATENT DOCUMENTS 10,229,356 B1 *  3/2019  Liu ..................... G06N 3/084
2016/0321542 A1 * 11/2016  Towal .................. G06N 7/005
(Continued)

OTHER PUBLICATIONS

Yu Ji, Youhui Zhang, Wenguang Chen, and Yuan Xie. 2018. Bridge the Gap between Neural Networks and Neuromorphic Hardware with a Neural Network Compiler. SIGPLAN Not. 53, 2 (Feb. 2018), 448-460. DOI:https://doi.org/10.1145/3296957.3173205 (Year: 2018).*
(Continued)

*Primary Examiner* — James D. Rutten
(74) *Attorney, Agent, or Firm* — Padowithz Alce

(57) ABSTRACT

Systems and methods for improving a computational performance of a mixed-signal integrated circuit includes identifying a suboptimal graph component of a computation graph of a subject application, wherein: (i) the computation graph comprises a plurality of graphical nodes representing computational operations and a plurality of graphical edges representing data dependencies between the graphical nodes, and (ii) the suboptimal graph component comprises a subset of the plurality of graphical nodes and the plurality of graphical edges that do not satisfy an optimal operation threshold; at compile time, selectively applying an optimizing transformation to the suboptimal graph component based on attributes of a first activation function within the suboptimal graph component, wherein the optimization transformation, when applied, transforms the suboptimal graph component to an optimal graph component that satisfies the optimal operation threshold; and reconstructing the computation graph using the optimal graph component in a place of the suboptimal graph component.

19 Claims, 11 Drawing Sheets

Related U.S. Application Data filed on Feb. 20, 2020, provisional application No. 62/940,487, filed on Nov. 26, 2019.

(51) Int. Cl.
| | | |
|---|---|---|
| *G06F 9/50* | (2006.01) | |
| *G06K 9/62* | (2006.01) | |
| *G06N 3/08* | (2006.01) | |

(56) References Cited

U.S. PATENT DOCUMENTS

| 2018/0157918 | A1* | 6/2018 | Levkova | G06K 9/4628 |
| 2018/0315157 | A1* | 11/2018 | Ould-Ahmed-Vall | G06F 7/483 |
| 2018/0321938 | A1* | 11/2018 | Boswell | G06F 9/30036 |
| 2019/0026625 | A1* | 1/2019 | Vorenkamp | G06N 3/063 |
| 2019/0066780 | A1* | 2/2019 | Hu | G11C 11/56 |
| 2019/0102671 | A1* | 4/2019 | Cohen | G06K 9/4628 |
| 2019/0392296 | A1* | 12/2019 | Brady | G06N 3/063 |
| 2020/0250539 | A1* | 8/2020 | Liu | G06N 3/0481 |
| 2020/0302298 | A1* | 9/2020 | Van Baalen | G06N 3/08 |
| 2020/0304293 | A1* | 9/2020 | Gama | G06F 17/147 |

OTHER PUBLICATIONS

Y. Xing, J. Weng, Y. Wang, L. Sui, Y. Shan and Y. Wang, "An In-depth Comparison of Compilers for Deep Neural Networks on Hardware," 2019 IEEE International Conference on Embedded Software and Systems (ICESS), Las Vegas, NV, USA, 2019, pp. 1-8 , doi: 10.1109/ICESS.2019.8782480. (Year: 2019).*

Y. Yu, C. Wu, T. Zhao, K. Wang and L. He, "OPU: An FPGA-Based Overlay Processor for Convolutional Neural Networks," in IEEE Transactions on Very Large Scale Integration (VLSI) Systems, vol. 28, No. 1, pp. 35-47, Jan. 2020, First published Oct. 8, 2019 doi: 10.1109/TVLSI.2019.2939726. (Year: 2019).*

\* cited by examiner

200

```
┌─────────────────────────────────────────────────┐
│   Building or Receiving a Directed Graph S210   │
└─────────────────────────────────────────────────┘

┌─────────────────────────────────────────────────┐
│    Identifying Suboptimal Graph Components S220 │
└─────────────────────────────────────────────────┘
```

Implementing Optimization Transform S230

Adjusting Features of an MMA S232

Activation Function Trasnformation S234

Deriving a Directed Graph S240

Building or Receiving a Directed Graph S210

Identifying Suboptimal Graph Components S220

Implementing Optimization Transform S230

Concatenate two or more MMADots S232

Activation Function Transformation S234

Deriving a Directed Graph S240

```
┌─────────────────────────────────────────────────────┐
│   Building or Receiving a Directed Graph S210       │
└─────────────────────────────────────────────────────┘

┌─────────────────────────────────────────────────────┐
│   Identifying Suboptimal Graph Components S220      │
└─────────────────────────────────────────────────────┘

┌─ ─ ─ ─ ─ ─ ─ ─ ─ ─ ─ ─ ─ ─ ─ ─ ─ ─ ─ ─ ─ ─ ─ ─ ─ ─ ┐
│       Implementing Optimization Transform S230      │
│  ┌───────────────────────────────────────────────┐  │
│  │ Apply an Activation Function to a Restricted  │  │
│  │             Input S232                        │  │
│  └───────────────────────────────────────────────┘  │
│  ┌───────────────────────────────────────────────┐  │
│  │         Adjusting a Bias Term S234            │  │
│  └───────────────────────────────────────────────┘  │
│  ┌───────────────────────────────────────────────┐  │
│  │   Applying the MMA with Adjusted Bias S236    │  │
│  └───────────────────────────────────────────────┘  │
└─ ─ ─ ─ ─ ─ ─ ─ ─ ─ ─ ─ ─ ─ ─ ─ ─ ─ ─ ─ ─ ─ ─ ─ ─ ─ ┘

┌─────────────────────────────────────────────────────┐
│         Deriving a Directed Graph S240              │
└─────────────────────────────────────────────────────┘
```

FIGURE 4

SYSTEMS AND METHODS FOR IMPLEMENTING OPERATIONAL TRANSFORMATIONS FOR RESTRICTED COMPUTATIONS OF A MIXED-SIGNAL INTEGRATED CIRCUIT

CROSS-REFERENCE TO RELATED APPLICATIONS

This application claims the benefit of U.S. Provisional Application No. 62/940,487, filed 26 Nov. 2019, U.S. Provisional Application No. 62/978,910, filed 20 Feb. 2019, and U.S. Provisional Application No. 62/990,701, filed 17 Mar. 2020, which are incorporated in their entireties by this reference.

TECHNICAL FIELD

The inventions described herein relate generally to the integrated circuitry architecture field, and more specifically to new and useful intelligent integrated circuits and methods of computing with the intelligent integrated circuit in the integrated circuitry architecture field.

BACKGROUND

Today, the various implementations of artificial intelligence and machine learning are driving innovation in many fields of technology. Artificial intelligence (AI) systems and artificial intelligence models (including algorithms) are defined by many system architectures and models that enable machine learning (deep learning), reasoning, inferential capacities, and large data processing capabilities of a machine (e.g., a computer and/or a computing server). These AI systems and models are often trained intensively to perform one or more specific tasks, such as natural language processing, image recognition, planning, decision-making, and the like. For example, a subset of these AI systems and models include artificial neural network models. The training of an artificial neural network model may, in many cases, require thousands of hours across the training cycle and many terabytes of training data to fine tune associated neural network algorithm(s) of the model before use.

However, once trained, a neural network model or algorithm may be deployed quickly to make inferences to accomplish specific tasks (e.g., recognizing speech from speech input data, etc.) based on relatively smaller datasets when compared to the larger training datasets used during the training cycle. The inferences made by the neural network model or algorithm based on the smaller datasets maybe a prediction about what the neural network model calculates to be a correct answer or indication about a circumstance.

Still, while neural network models implementing one or more neural network algorithms may not require a same amount of compute resources, as required in a training phase, deploying a neural network model in the field continues to require significant circuitry area, energy, and compute power to classify data and infer or predict a result. For example, weighted sum calculations are commonly used in pattern matching and machine learning applications, including neural network applications. In weighted sum calculations, an integrated circuit may function to multiply a set of inputs ($x_i$) by a set of weights ($w_i$) and sum the results of each multiplication operation to calculate a final result ($z$). Typical weighted sum calculations for a machine learning application, however, include hundreds or thousands of weights which causes the weighted sum calculations to be computationally expensive to compute with traditional digital circuitry. Specifically, accessing the hundreds or thousands of weights from a digital memory requires significant computing time (i.e., increased latency) and significant energy.

Accordingly, traditional digital circuitry required for computing weighted sum computations of a neural network model or the like tend to be large to accommodate a great amount of digital memory circuitry needed for storing the hundreds of thousands of weights required for the neural network model. Due to the large size of the circuitry, more energy is required to enable the compute power of the many traditional computers and circuits.

Additionally, these traditional computers and circuits for implementing artificial intelligence models and, namely, neural network models may be suitable for remote computing processes, such as in distributed computing systems (e.g., the cloud), or when using many onsite computing servers and the like. However, latency problems are manifest when these remote artificial intelligence processing systems are used in computing inferences and the like for remote, edge computing devices or in field devices. That is, when these traditional remote systems seek to implement a neural network model for generating inferences to be used in remote field devices, there are unavoidable delays in receiving input data from the remote field devices because the input data must often be transmitted over a network with varying bandwidth and subsequently, inferences generated by the remote computing system must be transmitted back to the remote field devices via a same or similar network. Additionally, these traditional circuit often cannot manage the computing load (e.g., limited storage and/or limited compute) and may often rely on remote computing systems, such as the cloud, to perform computationally intensive computations and store the computation data (e.g., raw inputs and outputs. Thus, constant and/or continuous access (e.g., 24×7 access) to the remote computing systems (e.g., the cloud) is required for continuous operation, which may not be suitable in many applications either due to costs, infrastructure limitations (e.g., limited bandwidth, low grade communication systems, etc.), and the like.

Implementing AI processing systems at the field level (e.g., locally at the remote field device) may be a proposed solution to resolve some of the latency issues. However, attempts to implement some of these traditional AI computers and systems at an edge device (e.g. remote field device) may result in a bulky system with many circuits, as mentioned above, that consumes significant amounts of energy due to the required complex architecture of the computing system used in processing data and generating inferences. Thus, such a proposal without more may not be feasible and/or sustainable with current technology.

Accordingly, there is a need for a deployable system for implementing artificial intelligence models locally in the field (e.g., local AI), and preferably to be used in edge devices, that do not result in large, bulky (edge) devices, that reduces latency, and that have necessary compute power to make predictions or inferences, in real-time or substantially real-time, while also being energy efficient.

The below-described embodiments of the present application provide such advanced and improved integrated circuits and implementation techniques capable of addressing the deficiencies of traditional systems and integrated circuit architectures for implementing AI and machine learning.

BRIEF SUMMARY OF THE INVENTION(S)

In one embodiment, a method for improving an operational performance of a mixed-signal integrated circuit includes implementing one or more computing devices executing a compiler program that: (i) reads in a computation graph of an application or a program; (ii) identifies a low-precision sub-component of the computation graph that decreases a computational performance of the mixed-signal integrated circuit below a performance threshold; (iii) transforms the low-precision sub-component to a high-precision sub-component by selectively applying one or more distinct operational transformations to the low-precision sub-component based on operational attributes of an incumbent activation function, wherein the one or more distinct operational transformations at least replaces the incumbent activation function within the low-precision sub-component with a distinct succeeding activation function, wherein the distinct succeeding activation function within the high-precision sub-component improves the computational performance of the mixed-signal integrated circuit at or above the minimum precision threshold; and (iv) assigns the high-precision sub-component of the computation graph to one or more computation circuits of the mixed-signal integrated circuit.

In one embodiment, transforming the low-precision sub-component to the high-precision sub-component includes: maintaining a computational equivalence between the low-precision sub-component and the high-precision sub-component of the computation graph by modifying one or more of weight values and bias values of a matrix multiply accelerator of the mixed-signal integrated circuit based on operational attributes of the distinct succeeding activation function.

In one embodiment, the low-precision sub-component of the computation graph comprises a restricted data type output from a matrix multiply accelerator of the integrated circuit that cannot be assigned to one or more downstream computations that include the one or more computation circuits of the mixed-signal integrated circuit.

In one embodiment, a method for implementing an operational transformation in a mixed-signal integrated circuit includes identifying a suboptimal graph component of a computation graph of a subject application or a subject program, wherein: (i) the computation graph comprises a plurality of graphical nodes representing computational operations and a plurality of graphical edges representing data dependencies between the graphical nodes, and (ii) the suboptimal graph component comprises a subset of the plurality of graphical nodes and the plurality of graphical edges that do not satisfy an optimal operation threshold; at compile time, selectively applying an optimizing transformation to the suboptimal graph component based on attributes of a first activation function within the suboptimal graph component, wherein the optimization transformation, when applied, transforms the suboptimal graph component to an optimal graph component that satisfies the optimal operation threshold; and reconstructing the computation graph using the optimal graph component in a place of the suboptimal graph component.

In one embodiment, transforming the suboptimal graph component to the optimal graph component includes: removing the first activation function within the suboptimal graph component; and installing a second activation function in a place of the first activation function.

In one embodiment, transforming the suboptimal graph component to the optimal graph component further includes: increasing or decreasing a value of one or more biases associated with one or more weights of a matrix multiply accelerator of the mixed-signal integrated circuit based on attributes of the second activation function.

In one embodiment, the suboptimal graph component includes two or more distinct computational branches, wherein each of the two or more distinct computational branches produces a distinct output of a distinct matrix multiply accelerator; transforming the suboptimal graph component to the optimal graph component includes: (1) merging network operations of each of the distinct matrix multiply accelerator of each of the two or more distinct computational branches into a single, composite computational branch; (2) concatenating computational weights of the distinct matrix multiply accelerator of the two or more distinct computational branches; and (3) summing computational biases of the distinct matrix multiply accelerator of the two or more distinct computational branches.

In one embodiment, transforming the suboptimal graph component to the optimal graph component includes: removing the first activation function within the suboptimal graph component; and installing a second activation function in a place of the first activation function.

In one embodiment, the method includes identifying a restricted data type input to a matrix multiply accelerator of the mixed-signal integrated circuit, wherein transforming the suboptimal graph component to the optimal graph component includes: converting the restricted data type input to a suitable data type input to the matrix multiply accelerator by augmenting the suboptimal graph component with a second activation function that is applied to the restricted data type prior to an input to the matrix multiply accelerator.

In one embodiment, the computation graph comprises a computational flow of a neural network application in which each of the plurality of graphical nodes relates to a distinct network computational operation and each of the plurality of graphical edges relate to a dependency between a pair of distinct network computational operations.

In one embodiment, the optimal operation threshold comprises a minimum degree of precision of one or more computational outputs of the mixed-signal integrated circuit.

In one embodiment, the optimal operation threshold comprises a minimum level of computational performance of the mixed-signal integrated circuit.

In one embodiment, the method includes building the computation graph, by the compiler, includes translating the computation graph into an intermediate representation, wherein the intermediate representation comprises semantic data of the computation graph.

In one embodiment, the method includes identifying a restricted data type input to an analog linear transformation of the mixed-signal integrated circuit, wherein transforming the suboptimal graph component to the optimal graph component includes: converting the restricted data type input to a suitable data type input to the analog linear transformation by augmenting the suboptimal graph component with a second activation function that is applied to the restricted data type prior to an input to the analog linear transformation.

In one embodiment, the suboptimal graph component comprises a source computation node that computes a restricted data type output to multiple, distinct computation nodes; a subset of the multiple, distinct computation nodes have a data type restriction that limits an acceptance of the restricted data type output; transforming the suboptimal graph component to the optimal graph component includes: subtracting, within a branch between the source node and each of the multiple, distinct computation nodes outside of the subset, a predetermined adjustment value comprising one of a vector constant and one-half a bit width of a bit range one of the multiple, distinct computation nodes based on attributes of the first activation function within the source computation node; and after a computation at each of the subset of the multiple, distinct computation nodes, subtracting a product of a predetermined weight and a constant comprising one of a vector constant and one-half the bit width of a bit range one of the multiple, distinct computation nodes from a computational output of each of the subset of the multiple, distinct computation nodes.

In one embodiment, the suboptimal graph component comprises a source computation node that computes a restricted data type output to multiple, distinct computation nodes; a subset of the multiple, distinct computation nodes have a data type restriction that limits an acceptance of the restricted data type output; transforming the suboptimal graph component to the optimal graph component includes: augmenting a second activation function within branches of the subset of the multiple, distinct computation nodes; and after a computation at each of the subset of the multiple, distinct computation nodes, subtracting a product of a predetermined weight and a constant comprising one of a vector constant and one-half the bit width of one of the multiple, distinct computation nodes from a computational output of each of the subset of the multiple, distinct computation nodes.

In one embodiment, the suboptimal graph component comprises a source computation node that computes a restricted data type output to multiple, distinct computation nodes; a subset of the multiple, distinct computation nodes have a data type restriction that limits an acceptance of the restricted data type output; transforming the suboptimal graph component to the optimal graph component includes: augmenting, within a branch between the source node and each of the subset of the multiple, distinct computation nodes outside, a predetermined adjustment value comprising one of a vector constant and one-half a bit width of a bit range of one of the multiple, distinct computation nodes based on attributes of the first activation function within the source computation node; and after a computation at each of the subset of the multiple, distinct computation nodes, subtracting a product of a predetermined weight and a constant comprising one of a vector constant and one-half the bit width of a bit range one of the multiple, distinct computation nodes from a computational output of each of the subset of the multiple, distinct computation nodes.

In one embodiment, a method for improving an operational performance of a computation accelerator includes implementing one or more computing devices executing a compiler program that: (i) reads in a computation graph of an application or a program; (ii) identifies a low-precision sub-component of the computation graph that decreases an operational performance of the computation accelerator below a performance threshold; (iii) transforms the low-precision sub-component to a high-precision sub-component by selectively applying one or more distinct operational transformations to the low-precision sub-component based on operational attributes of an incumbent network operation, wherein the one or more distinct operational transformations at least replaces the incumbent network operation within the low-precision sub-component with a distinct succeeding network operation, wherein the distinct succeeding network operation within the high-precision sub-component improves the operational performance of the computation accelerator at or above the minimum precision threshold; and (iv) assigns the high-precision sub-component of the computation graph to one or more computation circuits of the computation accelerator.

In one embodiment, the computation accelerator comprises a mixed-signal integrated circuit, and the computation graph comprises a neural network graph.

BRIEF DESCRIPTION OF THE FIGURES

FIG. 2 illustrates a first implementation of a method 200 for implementing one or more operational transformations enabling performant computing within an integrated circuit accordance with one or more embodiments of the present application;

FIG. 3 illustrates a second implementation of a method 200 for implementing one or more operational transformations enabling performant computing within an integrated circuit accordance with one or more embodiments of the present application;

FIG. 4 illustrates a third implementation of a method 200 for implementing one or more operational transformations enabling performant computing within an integrated circuit accordance with one or more embodiments of the present application;

DESCRIPTION OF THE PREFERRED EMBODIMENTS

Figure 1:
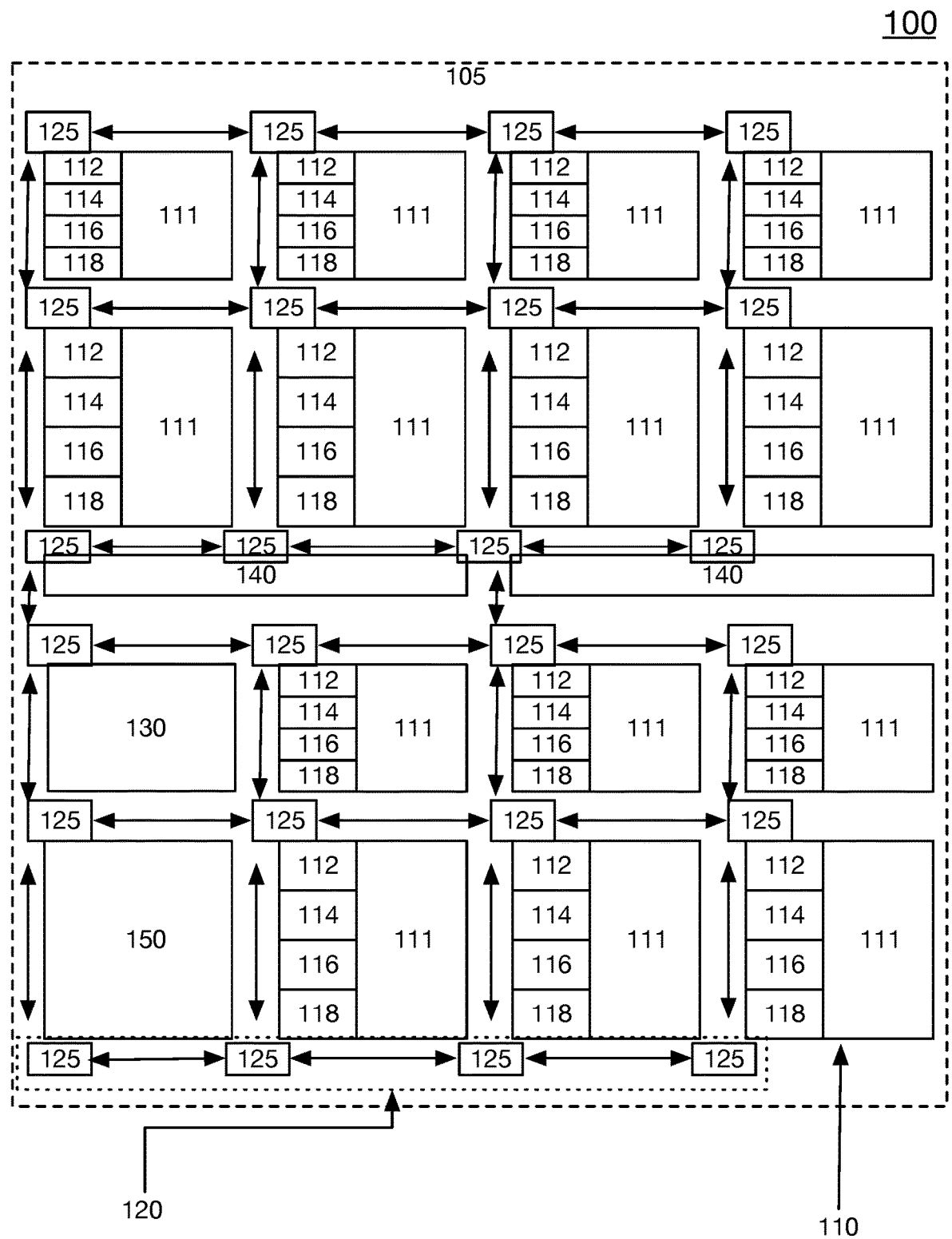
FIG. 1-1A illustrate schematics of an intelligence integrated circuit 100 in accordance with one or more embodiments of the present application.

The following description of preferred embodiments of the present application are not intended to limit the inventions to these preferred embodiments, but rather to enable any person skilled in the art of to make and use these inventions.

1. Overview

In traditional integrated circuits used in implementing computationally-intensive programs or applications (e.g., deep neural network algorithms) and the like, the typical integrated circuit (IC) architecture includes relatively large circuits requiring large area and power to operate and perform computations. This is because processing digital signals (e.g., binary signals) often requires large and power hungry implementations of circuits. Thus, for many technological implementations of computationally-intensive programs, such as artificial intelligence models, the resulting computer ICs having these large circuits for processing digital signals are also large and therefore, less feasible to include in space-constrained edge devices and the like.

Further, a great majority of the computational effort of an integrated circuit in implementing computationally-intensive applications, such as neural network models, involve performing thousands to millions of matrix multiplications. Further, in digital signal processing for neural network models, multiply-accumulate operations may also be performed in which a product of two numbers is computed and the product then added to an accumulator. Thus, when neural network models are implemented using only or primarily digital circuitry, the resulting digital circuitry consumes large amounts of energy performing the calculations and storing weight coefficients for neurons and resultant products of the many multiply-accumulate operations.

As a technical solution to reduce power required for computing and an overall size of an integrated circuit that is capable of computationally-intensive processes includes providing mixed-signal computing architectures that may be implemented utilizing extremely area efficient digital-to-analog converters (DACs) (rather than standard DACs which are fundamentally large, or area-intensive) along-side the various other circuitry of an integrated circuit to achieve area and energy efficiencies. However, integrated circuits that maybe implemented using traditional DACs for computationally-intensive implementations, may most likely require a very large number of DACs (e.g., thousands of DACs) to achieve matching and to achieve required speed and noise performances. Therefore, while traditional implementations of DAC architectures maybe useful to reduce energy required by and an overall size of an integrated circuit, these traditional implementations of DAC architectures may not be feasible due to the large number of DACs that maybe necessary to process computationally-intensive AI programs and applications.

The embodiments of the present application, however, solve at least the above-noted technical problems by implementing, in various forms, a global (reference signal source) DAC that is in operable communication and control of a plurality of local (output) DACs. The embodiments described herein function to solve a fundamental technical problem with mixed-signal computing architectures by enabling a creation of many precise DACs without consuming a very large area on a chip. By contrast, modern DACs implementing computationally-intensive programs and the like may typically become large due to matching constraints on their various components, which dictate the lower bound on device size. This technical problem becomes further apparent and problematic once the DAC resolution surpasses 6-8 bits. Consequently, these traditional DACs may not be energy or size efficient once noise and speed are considered in the DAC's architecture.

In embodiments of the present application, the global (reference) DAC functions as a signal source (in some embodiments, the only reference signal source) to each of the local (mirror) DACs. In a preferred embodiment, the local DACs function to serially accumulate analog reference signals generated by the global DAC over a number of clock cycles. In such embodiment, the accumulation by each of the local DACs is onto a capacitor or other energy storage device for the providing a new or total output (e.g., a charge representing the accumulation of the reference signals).

Accordingly, implementing the global DAC and plurality of local DACs in the manner described above enables a reduction of a number of high-precision reference devices required for driving the local DACs, as each local DAC would typically require a respective dedicated reference devices that provide a reference signal. In traditional DACs, a reference signal generation as well as output circuitry may be usually integrated into a single large DAC. Accordingly, in several embodiments of the present application, the global DAC functions to provide precise source signaling to each of a plurality of local DACs therefore ameliorating the matching requirement for implementing accurate DACs and more specifically, a need for a plurality of reference signal source DACs to drive a plurality local output DACs (e.g., eliminating 1-to-1 match). Accordingly, a reduction in DAC architecture area may be achieved and, computer and power efficiencies that allow edge computing devices and the like to perform complex and computer-intensive operations including AI computing locally at a source of the input data.

1.1 Operational Transformations Overview

Due to one or more unique characteristics of mixed-signal computing architectures, not all operations that are possible in pure digital implementations are possible in mixed-signal computing. In particular, digital/analog accelerators, such as a matrix multiply accelerator or the like, may have input and/or output data type restrictions that can lead to substantially decreased performance and/or precision or an inability to directly perform a desired computation. In one or more embodiments of the present application, the systems and/or methods may include transformations in a network graph that result in performance enhancements such as, but not limited to, improved accuracy, reduced computing time, reduced power usage, increased energy efficiency, improved utilization of available resources, and the like. Prior graph network transformations are incapable of handling the unique challenges of mixed-signal computation. Preferably, a network graph after one or more of the disclosed transformations may produce the mathematically same or similar result.

To add functionality and/or to improve performance of a mixed-signal integrated circuit, a graph compiler may receive a network graph or build a network graph of a computationally-intensive application or program, such as a neural network. In one or more embodiments, the graph compiler may identify graph components that can be transformed into one or more graph components. The identified graph components may be transformed by the graph compiler in an optimization step. Multiple transformations of both the same and different types of transformation may be performed. The graph compiler may derive or construct a new computational graph of an application or algorithm based on applying one or more optimizations (as described herein) to one or more components of the network graph. reconstruct the network graph with the optimizations of the network graph components. The graph compiler maybe any suitable of software implemented via hardware (e.g., integrated circuit) and that receives user input to perform the one or more optimization operations described herein.

Additionally, or alternatively, in one or more embodiments of the present application, a transformation may include a ReLU activation being replaced with a HardSigmoid activation along with modifying a matrix multiply bias. During ReLU activation, all negative numbers may be set to zero which may lead to a significant loss in a bit range. In such embodiments, the transformation may involve subtracting approximately half the bit range from the bias during the matrix multiply and replacing the ReLU activation with a HardSigmoid activation. This bias shift along with the HardSigmoid activation replacement may allow a more precise calculation within a mixed signal computing environment since the formerly negative numbers are captured by the transformation rather than discarded by the initial activation function (i.e., the ReLU activation). In a non-limiting example, if the calculations are performed in unsigned 8 bits then the bias offset with the HardSigmoid activation may be 128.

According to an embodiment, one or more of the transformations may include Fuse MMADots where multiple MMADots are joined together such that the addition can be performed in the matrix multiply accelerator (MMA). Pre-transformation, each edge between nodes in a computational graph may perform the matrix multiply followed by a HardTanh (node), and the results may be combined in an Add operation. After the transformation, each leg may have the respective weight and bias joined together, and the combined values of weight and bias maybe used to complete the matrix multiply which is followed by a ReLU activation. This transformation may allow more computation to happen in the matrix multiply accelerator which may lead to increased accuracy of the MMA computations and an overall improved performance of the integrated circuit.

According to yet another embodiment, signed input data to a matrix multiply accelerator may be converted to unsigned input data. Certain embodiments of the matrix multiply accelerator may not be able to handle signed input data. For the transformation, the signed data may be converted into unsigned data via a HardSigmoid activation followed by a matrix multiply where the bias has the sum of weights multiplied by half the data range or bit range subtracted from the bias. In a non-limiting example, if the calculations are 8 bits then the new bias is equal to the original bias minus the sum of weights times 128.

2. A Tile-Based Intelligence Processing Mixed-Signal Computing Architecture

Figure 1A:
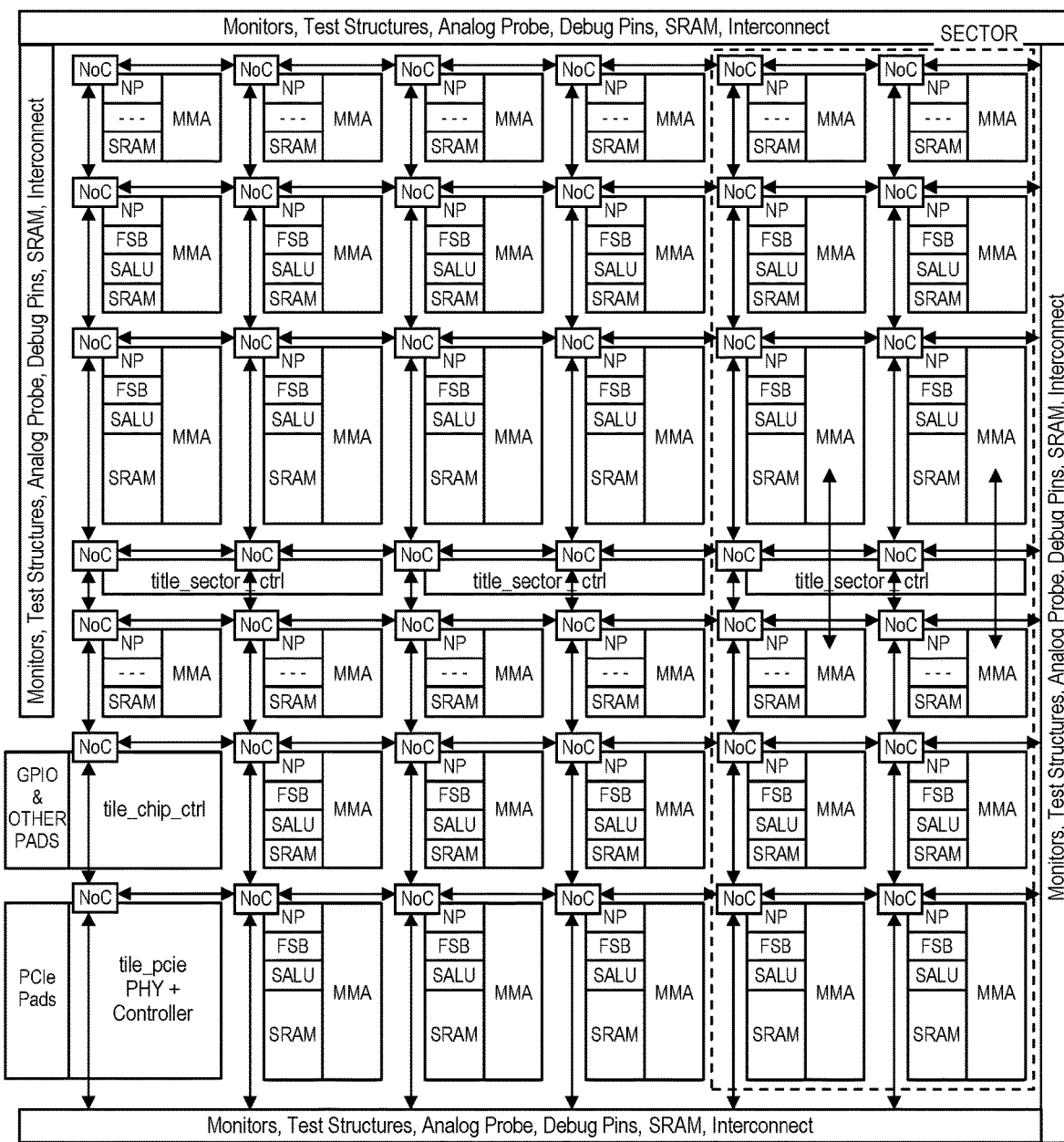

As shown in FIGS. 1-1A, an intelligence processing computing architecture 100 (or alternately referred to herein as an intelligence processing integrated circuit 100) for processing computationally-intensive programs and/or applications (e.g., machine learning applications, neural networks, etc.) includes an intelligence processing array 105 that includes a plurality of intelligence (computing) processing (tiles) units 110, a network on chip system 120 that includes a plurality of network-on-chip routers 125, an integrated circuit controller circuit 130, tile sector controller circuit 140, and a serial connection bus 150, as described in U.S. patent application Ser. No. 16/458,917, which is incorporated herein in its entirety by this reference. Preferably, each of the plurality of intelligence processing units 110 includes a matrix multiply accelerator in (may also be referred to herein as an accelerator circuit), a computer processing circuit (e.g., a microprocessor, a nano-processor, or the like) 112, a flow scoreboard (token-based governance) module 114, a single instruction multiple data (SIMD) unit 16 (e.g., streaming arithmetic logic unit or the like), and a local buffer (e.g., static random access memory (SRAM) or the like) 18. Additionally, in one preferred embodiment, each of 130, 140, and 150 may include a computer processing circuit 112, a flow scoreboard module 114, a SALU 116, and a local buffer 118. In one or more embodiments, the local data buffer 118 may sometimes be referred to herein as an on-tile memory or on-tile buffer indicating that the local data buffer 118 may be arranged within an intelligence processing tile 110 and in direct communication with various or one or more circuits, components, and/or modules within the intelligence processing tile no. FIG. 1A includes a further detailed embodiment of the intelligence processing computing architecture 100 and includes additional peripheral interconnects for interfacing with the intelligence processing array 105. For instance, test structures, monitors, analog probes, and/or any suitable peripheral device may be connected along or arranged along the periphery of the intelligence processing array 105 of the intelligence computing architecture 100.

3. A Method for Implementing Operational Transformations

As shown in FIG. 2, a method 200 for implementing one or more operational transformations in a mixed-signal computing architecture may include building or receiving a directed computation graph S210, identifying suboptimal graph components of the directed computation graph S220, implementing optimization transforms S230, and reconstructing the directed graph with optimizations S240.

It shall be noted that each step of the method 200 may be executed in parallel on the same integrated circuit or on a network of integrated circuit components. Furthermore, each step may be subdivided on the same integrated circuit or across a network of integrated circuits. In a non-limiting example, each of the optimizing transforms performed in S230 may be performed in parallel by a network of integrated circuits and the results of S230 combined in S240. In one or more embodiments, any or part of S210, S220, S230, and S240 may be performed by any combination of software, hardware (e.g., integrated circuit), and firmware.

In one or more embodiments, the transformed network (i.e., transformed directed computation graph) created in S240 may be loaded by the mixed-signal computing device where the load may be a push by a host device, a pull request from the mixed-signal computing device, an automatic update, or another event in which there is a desire to have the mixed-signal computing device load the transformed network.

3.1 Building or Receiving Directed Computation Graph

S210, which includes identifying an input of a directed graph of a dense algorithm or the like, may function to receive a graph or build a new graph illustrating one or more features and/or operations of an application or a program, such as a neural network application or the like. In some embodiments, the graph may represent a neural network application that comprises nodes and edges which identify the points of connections and the operation of the network (e.g., a flow of input and outputs of data between nodes, a computational flow of input and execution of tasks along the computational flow). In such embodiments, the nodes may represent distinct network operations (or activation functions) and edges between nodes may represent the dependencies, e.g., inputs and outputs from nodes, between network operations. In one or more embodiments, network operation operands may be rank-n tensors. It shall be noted that the graph, in some embodiments, may be described in any suitable data structure or language, e.g., an Open Neural Network Exchange (ONNX) format.

Preferably, in one or more embodiments, S210 or a subset of S210 maybe performed by a compiler, such as graph compiler. In some embodiments, the compiler may reside on or may be implemented by a computing device or on a network computing device, e.g., server, cloud computing, and the like. In such embodiments, the compiler may function interactively with an administrator or be controlled by another application, or a combination of interactive and another application. In some embodiments, the compiler may be configured to automatically run based on certain conditions such as a lifetime of the network graph, events within the neural network, events happening in other applications, or any suitable event or condition. Preferably, after reading a computation graph, the compiler may translate the computation graph into an intermediate representation (IR) where the IR captures the semantics of the computational graph of a given application. The IR may be used completely or in part for any of the remaining steps, e.g., steps S220, S230, and S240 or any other method or technique described herein.

3.2 Identifying Suboptimal Graph Components

S220, which includes identifying sub-graphs having one or more performance mitigating restrictions or conditions, may function to designate or flag one or more components of a directed graph or a computation graph having an attribute or a condition that may cause an integrated circuit to operate in a suboptimal manner (e.g., inefficiently in computational performance and/or energy consumption, etc.). In some embodiments, the attribute or the condition of the graph may include a data type restriction, such as signedness (i.e., a character or numerical value having a positive or a negative sign). In one or more embodiments, the attribute or the condition of the graph may include a feature that inherently computes with a lowered precision, computes with extra or extraneous steps, or any other configuration that would otherwise reduce a computational efficacy of a given integrated circuit (e.g., integrated circuit 100). In one or more embodiments, once one or more suboptimal sub-graphs have been identified, S220 may function to extract and/or deconstruct each the one or more sub-graphs for a distinct optimization procedure, operation, and/or transformation.

In some embodiments, one or more of a variety of data types may be identified, e.g., signed (e.g., negative sign for a negative number value and the like), unsigned, floating, fixed, characters, character strings, pointers, arrays, structures, unions, classes, variants and combinations of the preceding datatypes, and any other datatype that could be used in either a native form or a transformed form during mixed-signal computation. It shall be noted that certain data types may not be fully or easily processed in a direct manner or otherwise be applied to certain configurations of mixed-signal computing environments. As a non-limiting example, certain embodiments of a matrix multiply accelerator may be unable to compute with signed input data. Accordingly, in such examples, a transformation of the signed input data into unsigned input data may be required to enable the matrix multiply accelerator to effectively compute against the input.

In some circumstances, due to various hardware limitations of mixed-signal computing environments, certain computations may be more precise than others. As a non-limiting example, a matrix multiply accelerator operation followed by a ReLU activation function may lose approximately half the data range due to the ReLU activation function setting all negative values to zero. Implementing one or more embodiments of the present application may enable a full range of data to be regained or maintained by changing a bias of the matrix multiply accelerator and replacing the ReLU activation function with a HardSigmoid activation function. In such embodiments, a HardSigmoid activation function may function to shift out to a positive (bit) range the output values having signedness (i.e., a negative sign and negative value). In this way, only positive values along a bit range may be provided as output from a matrix multiply accelerator thereby improving a precision and/or accuracy of a matrix multiply operation since all signed (negative sign) and unsigned (positive) output values of a matrix multiple accelerator are considered in subsequent or downstream operations of a mixed-signal integrated circuit.

Additionally, or alternatively, due to analog and digital blocks in a mixed-signal computing environment requiring varying amounts of power and computation time, certain operations may preferably be performed in either the analog or the digital domain. As a non-limiting example, with ResNet skip links containing multiple parallel branches that are summed together after a linear activation, e.g., HardTanh activation, each parallel branch may contain a matrix multiply accelerator operation. In one or more embodiments of the present application, the method 200 may function to concatenate the weights and biases of the parallel branches containing a matrix multiply accelerator into a single matrix multiply accelerator which may improve accuracy of the accelerator and additionally, reduce the time and power required to perform the operation, as described in more detail in a following section.

3.3 Optimization Transformations

S230, which includes converting suboptimal (e.g., low-precision, a measured precision of the integrated circuit that does not satisfy a minimum precision threshold or minimum precision state) sub-graph components to optimal (e.g., higher-precision, a measured precision of the integrated circuit that satisfies a minimum precision threshold or minimum precision state) sub-graphs with optimization transformations, may function to transform graph nodes and edges into nodes and edges that may execute with extended capacities and/or improved performance. In one or more embodiments, a transformation of a graph component may include modifying one or more parameters, e.g., biases and weights of a matrix multiply accelerator. In some embodiments, the transformation may further include replacing, removing, or adding an activation function where the activation function can be any activation function including a linear activation and/or a nonlinear activation.

It shall be noted that any transformation may be performed so long as a valid graph configuration is obtained, e.g., adjusting matrix multiply accelerator weights and biases, concatenating parameters, replacing activation functions, adding activation functions between nodes, replacing parallel paths into a single path, replacing serial path with multiple parallel paths, and the like. The transformation may include any number of nodes and edges, and be repeated multiple times.

3.3.1 ReLU to HardSigmoid Transformation

Figure 5:
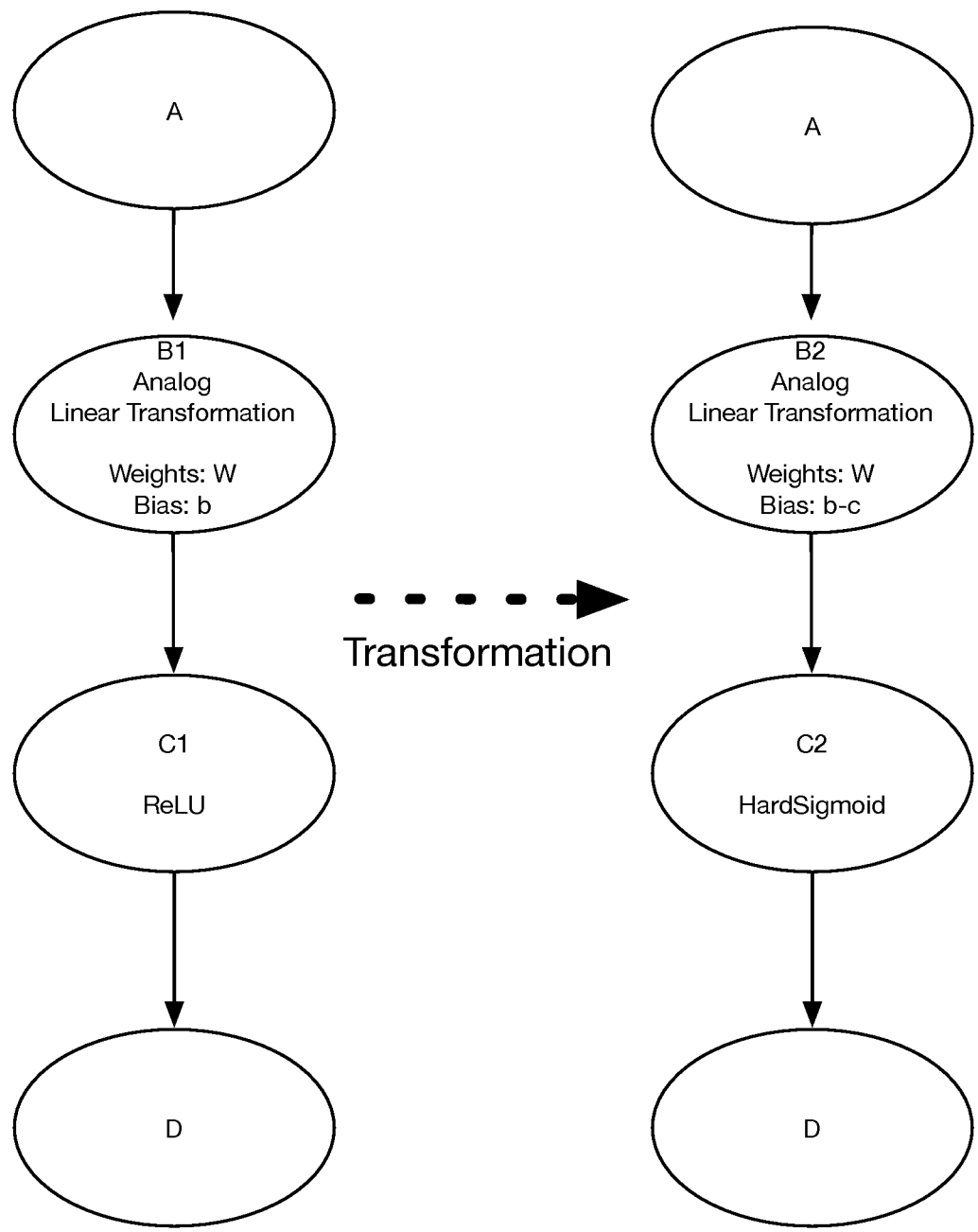
FIG. 5 illustrates an exemplary schematic of a first transformation according to a first implementation in accordance with one or more embodiments of the present application.

In a first implementation, S230, which includes implementing one or more optimization transformations, may function to identify a limited activation function (e.g., a rectifier linear unit (ReLU) transformation) within a designated/marked/flagged sub-graph component and replace the limited activation function with a second (optimal) activation function (e.g., a HardSigmoid) that improves the performance of the integrated circuit, as shown by way of example in FIGS. 2 and 5. In one or more embodiments, a limited activation function preferably relates to an activation function that adversely computes against an output (or input to the activation function) such that a full range of the output becomes unavailable. S230 may additionally, or alternatively include adjusting one or more features of an accelerator (e.g., matrix multiply accelerator), including one or more of a bias term and weights (i.e., coefficient values) of the accelerator. Thus, in such embodiments, S230 may function to adjust or change an initial activation function of a computational graph together with adjustments to one or more corresponding features of an accelerator. In one or more embodiments, an initial activation function may be referred to alternatively or additionally herein as a first activation function or an incumbent activation function.

In this first implementation, the one or more optimization transformations may supplant an incumbent or existing activation function within a sub-graph with a successor or new activation function that extends a processing capability or output of a given integrated circuit. Thus, in one example, a ReLU transformation found in a sub-graph of a directed graph of a neural network may be replaced with or changed to a HardSigmoid so that negative values are not automatically converted to zeroes and thus, implementing a succeeding activation function, such as the HardSigmoid, extends or maintains the available output of the integrated circuit by maintaining the negative values rather than converting negative values to zeroes. The hard in HardSigmoid refers to an activation that has a max value which may be kept constant for the upper range, e.g., 255 on an 8 bit unsigned system for all the upper ranges.

It shall be noted that an optimization of a computational graph of a dense algorithm (e.g., a neural network) may be performed before or after a training. For instance, a transformation which maybe performed in S230 including a replacement of a limited activation function (e.g., a ReLU activation) with a second activation function (e.g., a HardSigmoid activation) maybe performed in advance of training the underlying machine learning algorithm (e.g., a neural network). Once the adjustment to the computational graph of the machine learning model is completed, the machine learning algorithm may be trained with the optimization transformations in its structure. Alternatively, the adjustments to the computational graph of a computationally dense algorithm maybe performed after a training of the dense algorithm.

Accordingly, in this first implementation, S230 includes S232, which may function to adjust one or more features of an accelerator (e.g., an MMA) of an integrated circuit. In a preferred embodiment, S232 may function to implement a second or a replacement activation function in lieu of a given limited activation function by initially adjusting one or more features of a matrix multiply accelerator, including a weights bias term of a matrix multiply accelerator. In such preferred embodiment, the replacement or optimal activation function as implemented in S232 may function to adjust a weights bias term of a matrix multiply accelerator by subtracting half of a desired bit width or range. It shall be noted that an adjustment of the weights bias term maybe made in any suitable manner including, but not limited to, augmenting or reducing the weights bias term. In a non-limiting example, in the case that a desired bit width for a computation may be 256-bit with a range of 0 to 255, the optimal activation function may subtract half of the desired bit width, i.e., 128, from the weights bias term. Additionally, or alternatively, an actual adjustment or decrease in a bias term of a matrix multiply accelerator may depend on a gain and scaling factor. It shall be recognized in the above-noted example as well as with respect to all other non-limiting examples described herein, any suitable bit width or bit range may be employed by the computation units (e.g., MMAs) of an integrated circuit that is optimized using the methods and techniques described herein. For instance, a computation unit may employ a bit range of 0-1023, such that one-half of the bit width is computed as 512.

In one variant of this first implementation, S232 may additionally or alternatively function to adjust a weights bias term of a matrix multiply accelerator by adding or subtracting a constant vector, which may be any suitable constant value. Additionally, or alternatively, S232 may function to adjust a weights bias term of an accelerator by adding or subtracting a vector of constants, which may include any number of constant values.

Additionally, or alternatively, S230 including S234 may function to replace a first activation function with a second (optimal) activation function that enables a capture of a full bit range. In a non-limiting example, a ReLU activation function may lose approximately half a bit range due to setting the negative numbers to zero while a HardSigmoid activation (e.g., optimal activation function) may allow the full bit range which may lead to more accurate computations with dense algorithms or applications (e.g., neural network predictions). In this example, the ReLU activation may be deleted or removed from a sub-graph and the HardSigmoid added to a computation of the sub-graph.

In use, S230 may optionally function to assign the second activation function to a graph component of the computational graph. In a preferred embodiment, the second activation function may be a HardSigmoid activation function. The HardSigmoid may effectively add half a desired bit range which offsets a subtraction of half the bit range that was performed in the bias of a MMA. Any activation function may be used for the second activation function including one of or both linear and nonlinear activation functions.

3.3.2 Fusion of MMA Outputs

In a second implementation of S230, S230 may function to identify sub-graph components having summations of branched components. Each branch may produce an MMA output using a linear activation function, e.g., HardTanh, or any suitable activation function. The outputs of the activation function, in some embodiments, maybe signed and maybe sent to the SALU which may rescale the outputs, may add the outputs, and may, in some embodiments, apply a ReLU activation function or the like. In some embodiments, after a summation of the outputs, it is possible that any suitable activation function or no activation function may be applied.

Figure 6:
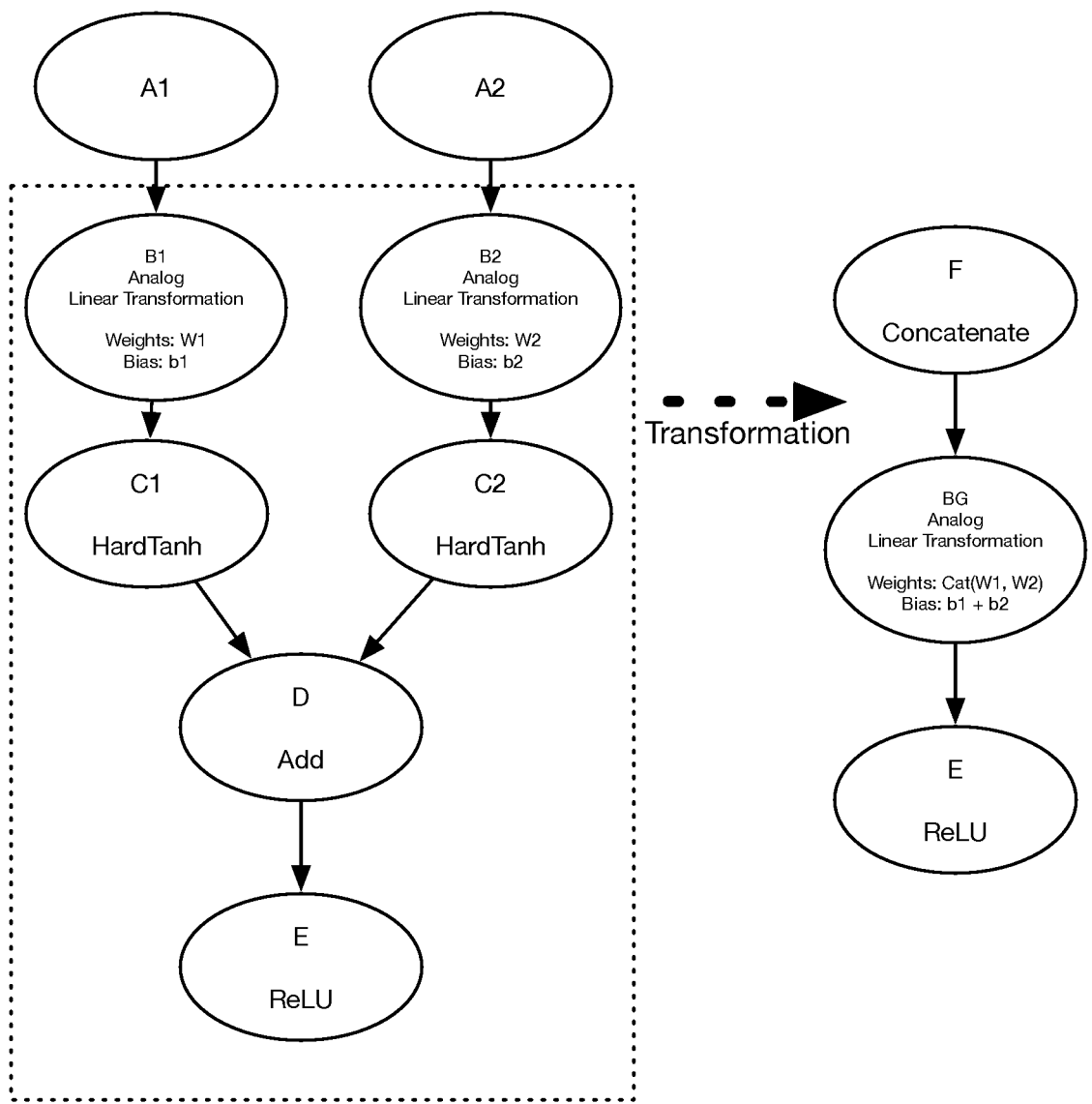
FIG. 6 illustrates an exemplary schematic of a second transformation according to a second implementation in accordance with one or more embodiments of the present application.

In this second implementation, S230 which includes S232 may function to fuse (concatenate) two or more MMADot products into a Single MMADot product, as shown by way of example in FIGS. 3 and 6. During the fusion, each weight of each original branch is concatenated and the bias of each original branch may be summed or added together. In a non-limiting example, the weight can be concatenated by summing the weight of each original branch and the bias may be summed by adding together the bias of each original branch. The concatenation can be performed by any mathematical operation. It shall be noted that any number of branches may be fused together.

In this second implementation, S230 which additionally includes S234 may function to perform an analog linear transformation. In a non-limiting example, the analog linear transformation maybe performed by an MMA where the weight of the MMA is the concatenated weight of the original branches and the bias is the added bias of the original branches as was calculated in a prior step (i.e., S232).

Additionally, or alternatively, S230 which includes S236 may function to replace a first incumbent activation function (e.g., a ReLU) with a second successor activation function (e.g., HardSigmoid) that optimizes an applied activation function along with subtracting half the bit range from MMA bias. In some embodiments, this may be a similar transformation as the ReLU to HardSigmoid transformation as described in previous section 3.3.1.

3.3.3 Signed Input to MMA

Figure 7:
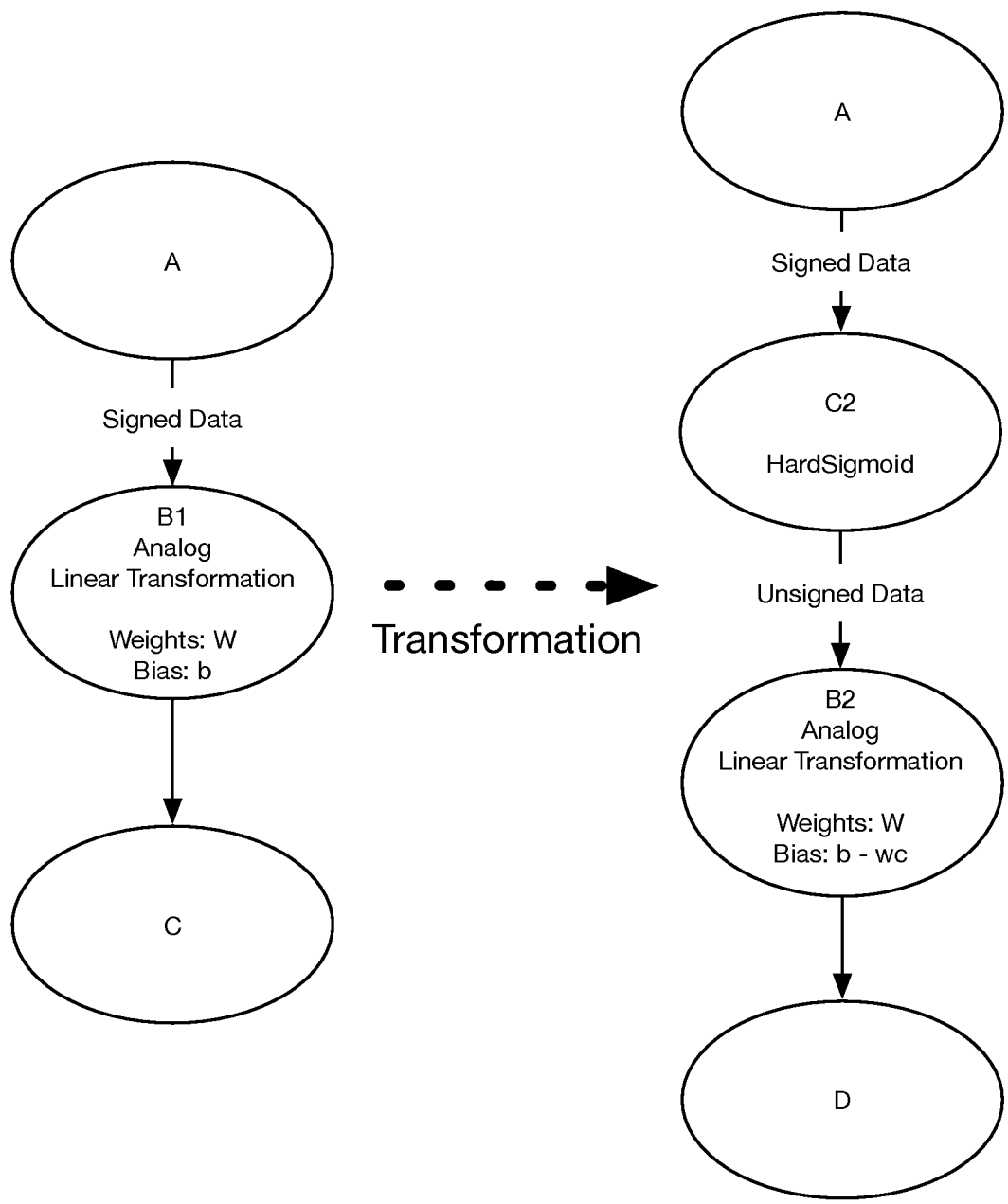
FIG. 7 illustrates an exemplary schematic of a third transformation according to a third implementation in accordance with one or more embodiments of the present application.

In a third implementation of S230, S230 may function to identify a sub-graph component having signed inputs (i.e., a data type restriction) to a matrix multiply accelerator and transform the sub-graph component such that the input to the matrix multiply accelerator is unsigned, as shown by way of example in FIGS. 4 and 7. In some embodiments, an activation function followed by changing mixed-signal computation parameters may convert one data type (e.g., signed) to another data type (e.g., unsigned). In certain embodiments of the matrix multiply accelerator, its hardware may not be able process signed numbers (or a restricted data type) and thus, to work with signed numbers in such embodiments, the method 200, in such embodiments, may convert the signed numbers to unsigned numbers to enable the MMA to perform a computation against the input.

In this third implementation, S230 includes S232 that may function to apply an activation function to the input having the data type restriction. Applying a HardSigmoid activation function to a signed number may convert the input signed number to an unsigned number.

Further, in the third implementation, S230 includes S234 which may function to adjust a bias term by the dot product of the weight vector $\vec{w}$ and a constant vector $\vec{c}$ ($\vec{c} \cdot \vec{w}$). Each element of 3 may be set to a value that is approximately half the bit range. In a preferred embodiment, S234 may implement the adjustment to the MMA weights bias term by subtracting $\vec{c} \cdot \vec{w}$. In a non-limiting example, in the case that a desired bit width for computation (256-bit, range 0, 255) then each element in $\vec{c}$ will be 128. In another non-limiting example, the new bias is b – $\vec{c} \cdot \vec{w}$ wherein each element of $\vec{c}$ is set to 128.

Additionally, or alternatively, S230 may additionally or optionally function to apply the MMA with the bias being adjusted by the dot product of the weight vector $\vec{w}$ and a constant vector $\vec{c}$ ($\vec{c} \cdot \vec{w}$). In a non-limiting example with the desired bit width (256-bit, range 0, 255), the bias for the MMA is b–$\vec{c} \cdot \vec{w}$ wherein each element of $\vec{c}$ is set to 128.

Though it has been described that the bias term, b, may be a constant for the MMA, b may be replaced with the vector $\vec{b}$ and each instance of b replaced with bias for the respective neuron (e.g., $\vec{c} \cdot \vec{w}$). Additionally, or alternatively, in some embodiments, the operational transformation may include replacing a bias b with a vector, vec{b}, and replacing the weight w with a matrix, matrix{W}.

3.3.4 Single Output to Multiple Input Nodes

In a fourth implementation of S230, S230 may function to identify a sub-graph component having a single output source (e.g., a source MMA) that may provide its generated output as input to multiple downstream computation nodes or computation layers. In some embodiments, the single output source may function to generate output having a data type restriction (e.g., signed outputs) that may not be accepted or suitable to a subset of the multiple downstream computation nodes (e.g., off-chip network layers or the like) and accepted or suitable to a distinct subset of the multiple downstream computation nodes. For example, a source MMA may function to generate signed outputs that maybe required my multiple downstream computation nodes, in which a first subset of the downstream computation nodes may function to accept signed inputs while a second subset cannot accept signed inputs for performing computations. The source MMA node, in some embodiments, may be connected via multiple distinct branches to each of the distinct downstream computation nodes such that any output from the source MMA may be replicated and transmitted along each of the multiple distinct branches to the distinct downstream computation nodes.

Figure 8:
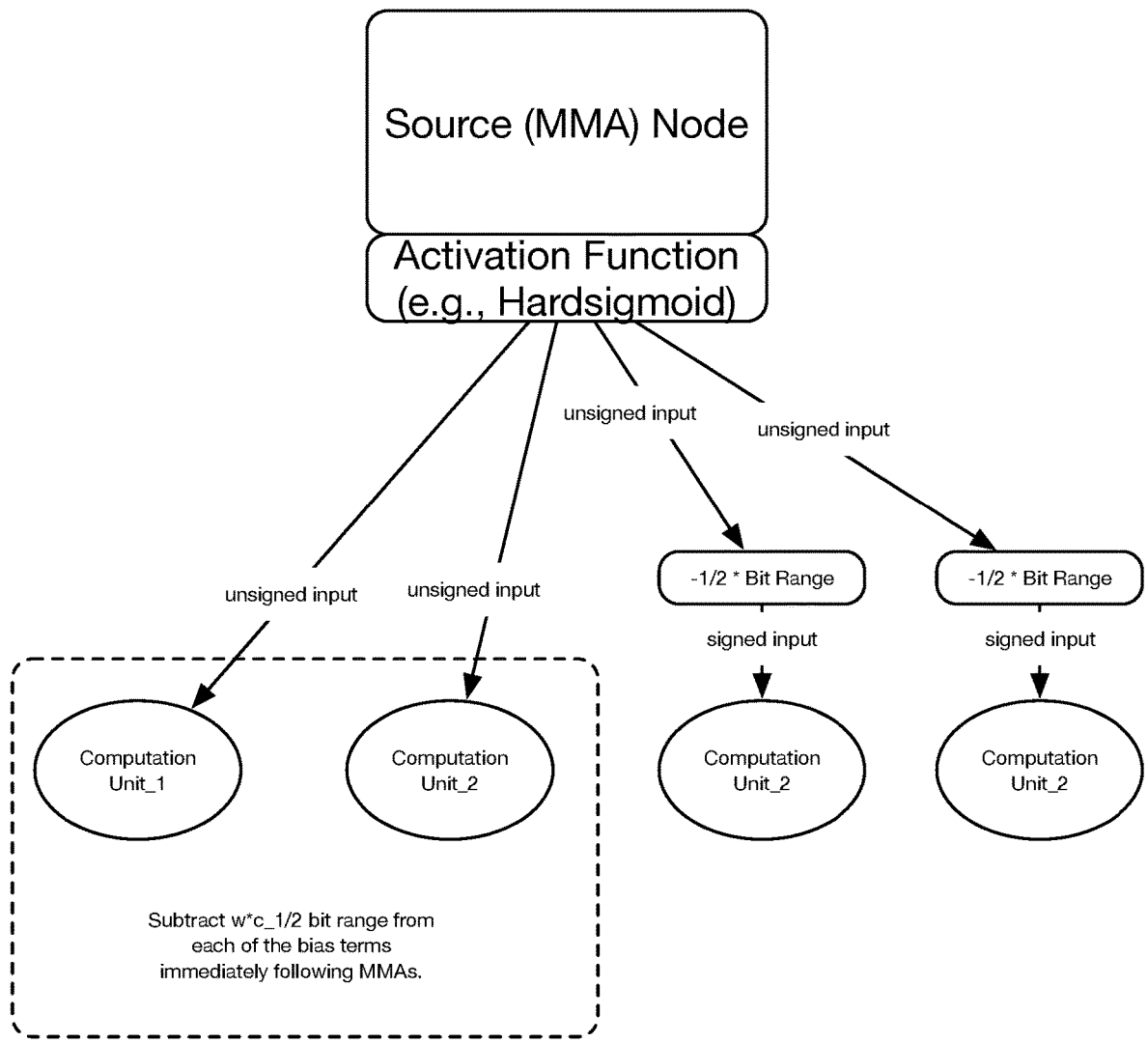
FIG. 8 illustrates an exemplary schematic of a fourth transformation according to a fourth implementation in accordance with one or more embodiments of the present application.

As shown by way of example in FIG. 8, in this fourth implementation, S230 which includes S232 may preferably function to augment the subcomponent graph with an activation function that may convert signed output of the source MMA to unsigned output that may be accepted by the subset of the downstream computation nodes having the data type restriction. In this embodiment, S232 may function to delete or remove an incumbent activation function (e.g., Hardtanh) and install a succeeding activation function (e.g., Hardsigmoid) within the source MMA that may be applied at the output of the source MMA and that may optimally transform the subgraph component for improved precision. Resultantly, each of the multiple distinct branches may function to receive a copy of the unsigned output from the source MMA.

Additionally, or alternatively, S232 may function to accommodate the downstream computation nodes that accept signed inputs, S232 may function to subtract half of a bit width from the branch associated with each of the computation nodes (e.g., MMAs) that accept signed inputs.

Additionally, or alternatively, S230 includes S234 which may function to adjust a bias term of the computation nodes receiving the unsigned input by the dot product of the weight vector $\vec{w}$ and a constant vector $\vec{c}$ ($\vec{c} \cdot \vec{w}$). Each element of $\vec{c}$ may be set to a value that is approximately half the bit range. Accordingly, in some embodiments, if the bit range is 0, 255, $\vec{c}$ maybe set to 128.

Figure 9:
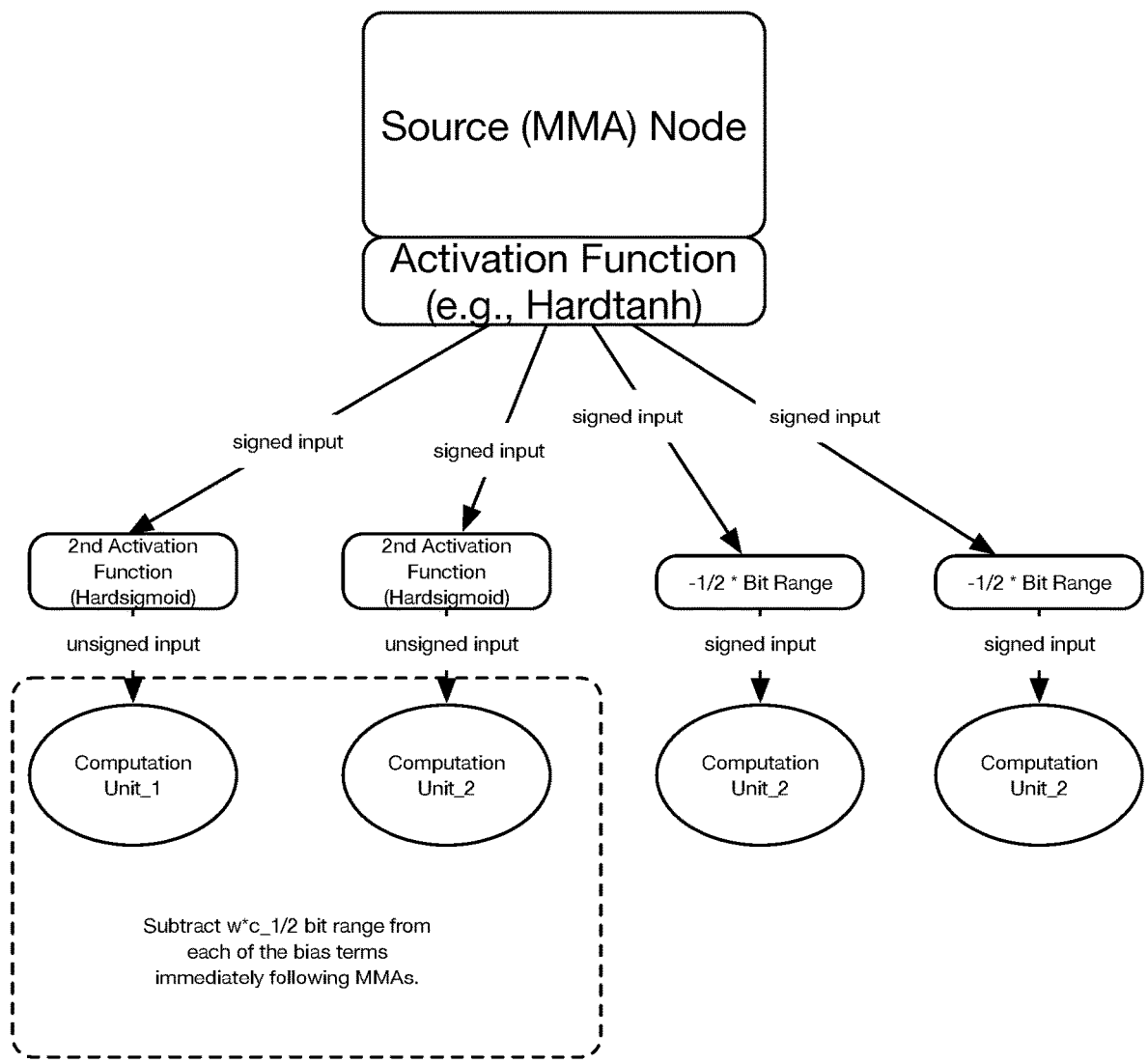
FIG. 9 illustrates an exemplary schematic of a fourth transformation according to a variant of a fourth implementation in accordance with one or more embodiments of the present application.

In a first variant of the fourth implementation, S230 which includes S232 may function to augment or otherwise, allow an application of a first activation function within the source MMA that may generate signed outputs (e.g., Hardtanh), as shown by way of example in FIG. 9. In this first variant, S232 may function to install or augment a standalone activation function (e.g., Hardsigmoid or the like) within each of the branches extending from the source MMA that require unsigned inputs. In this way, the additional an optimization transformation to eliminate the data restriction for the computation nodes requiring unsigned inputs may be localized to only the specific branches requiring unsigned inputs thereby alleviating a requirement to augment an adjustment value (e.g., –½ bit range, etc.) within the branches associated with the other computation nodes that can accept signed inputs.

Additionally, or alternatively, S230 includes S234 which may function to adjust a bias term of the computation nodes receiving the unsigned input by the dot product of the weight vector $\vec{w}$ and a constant vector $\vec{c}$ ($\vec{c} \cdot \vec{w}$). Each element of $\vec{c}$ may be set to a value that is approximately half the bit range. Accordingly, in some embodiments, if the bit range is 0, 255, $\vec{c}$ maybe set to 128.

Figure 10:
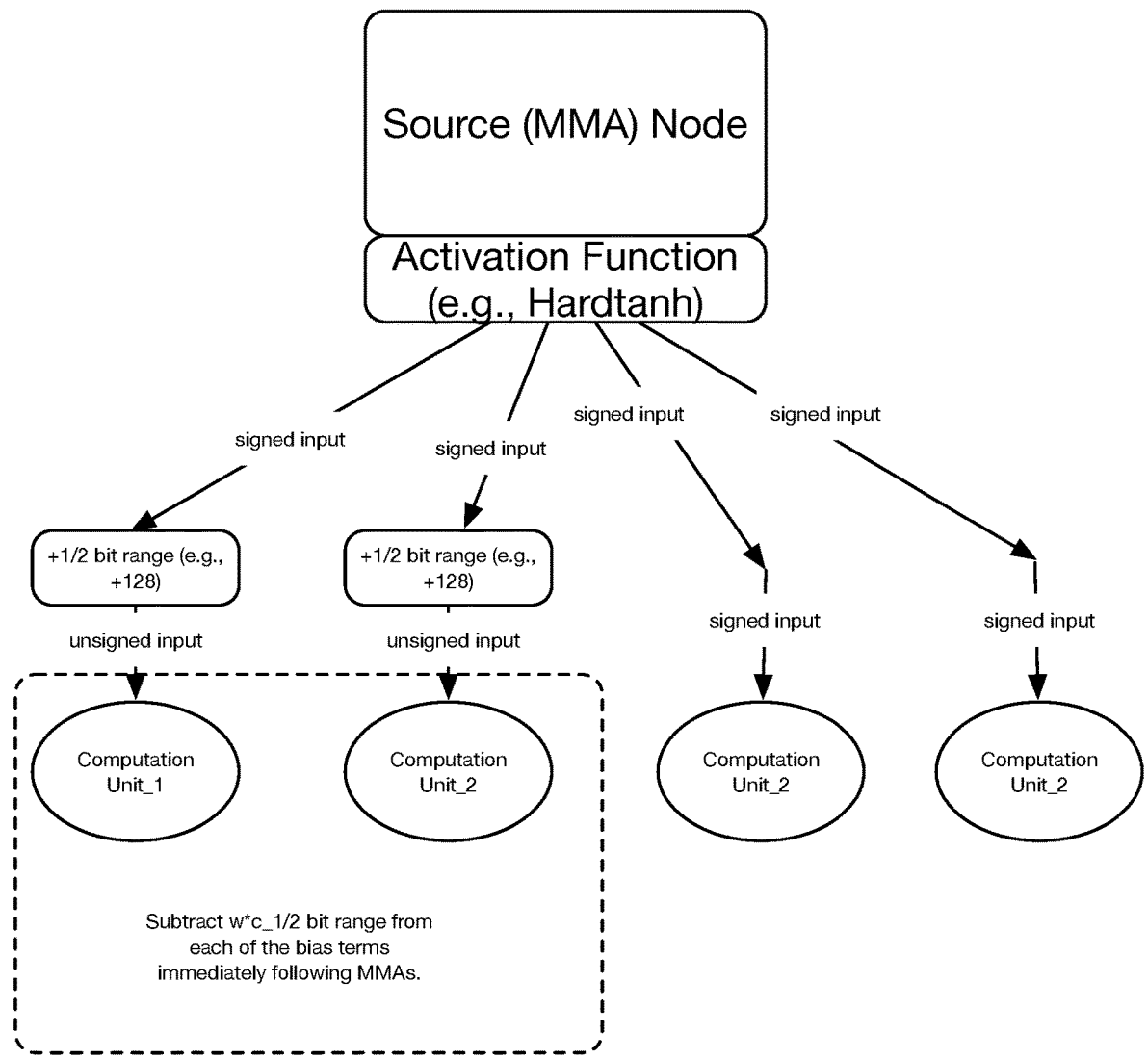
FIG. 10 illustrates an exemplary schematic of a fourth transformation according to a second variant of a fourth implementation in accordance with one or more embodiments of the present application.

In yet a second variant of the fourth implementation, S230 which includes S232 may function to augment or otherwise, allow an application of a first activation function within the source MMA that may generate signed outputs (e.g., Hardtanh). In this second variant, S232 may function to augment or add one-half a bit width into the branches associated with the computation nodes requiring unsigned inputs, as shown by way of example in FIG. 10. For instance, S232 may function to add one-half of the bit width into a branch ahead of a distinct computation node, which may function to shift signed inputs to unsigned inputs. In this second variant, the augmentation or addition of one-half bit range may be localized to the distinct branches extending from the source MMA that require unsigned inputs.

Additionally, or alternatively, S230 includes S234 which may function to adjust a bias term of the computation nodes receiving the unsigned input by the dot product of the weight vector $\vec{w}$ and a constant vector $\vec{c}$ ($\vec{c} \cdot \vec{w}$). Each element of $\vec{c}$ may be set to a value that is approximately half the bit range. Accordingly, in some embodiments, if the bit range is 0, 255, $\vec{c}$ maybe set to 128.

3.4 Deriving or Re-Constructing the Directed Graph with Optimizations

S240, which may function to include implementing a compiler, executed by a computing device or the like, to modify the directed computation graph at each low-precision or low-performance sub-graph component to derive or construct a new computational graph based on the application of one or more optimization transformations identified in S230 to one or more of various network graph components of a prior computational graph. S240 may include performing checks ensuring that the one or more transformations were performed correctly.

In some embodiments, deriving or constructing the new computational graph may include reconstructing the computation graph with the optimization transformation components that may function to replace one or more suboptimal graph components.

Additionally, or alternatively, S240 may function to assign the components of the reconstructed computation graph to computation units of a mixed-signal integrated circuit.

4. Computer Program Product(s) Implementing Intelligence Processing

The systems and methods of the preferred embodiments and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the various methods described herein.

As a person skilled in the art will recognize from the previous detailed description and from the figures and claims, modifications and changes can be made to the preferred embodiments of the invention without departing from the scope of this invention defined in the following claims.

What is claimed is:

1. A method for implementing an operational transformation in a mixed-signal integrated circuit, the method comprising:
    identifying a suboptimal graph component of a computation graph of a subject application or a subject program, wherein:
        (i) the computation graph comprises a plurality of graphical nodes representing computational operations and a plurality of graphical edges representing data dependencies between the graphical nodes, and
        (ii) the suboptimal graph component comprises a subset of the plurality of graphical nodes and the plurality of graphical edges that do not satisfy an optimal operation threshold, wherein the suboptimal graph component comprises a source computation node that computes a restricted data type output to multiple, distinct computation nodes, and wherein a subset of the multiple, distinct computation nodes have a data type restriction that limits an acceptance of the restricted data type output;
    at compile time, selectively applying an optimizing transformation to the suboptimal graph component based on attributes of a first activation function within the suboptimal graph component, wherein the optimization transformation, when applied, transforms the suboptimal graph component to an optimal graph component that satisfies the optimal operation threshold, wherein transforming the suboptimal graph component to the optimal graph component includes:
        within a branch between the source node and each node of the multiple, distinct computation nodes, setting a subtraction of a predetermined adjustment value comprising one of a vector constant and one-half a bit width of a bit range of one of the multiple, distinct computation nodes based on attributes of the first activation function within the source computation node; and
        after a computation at each node of the subset of the multiple, distinct computation nodes, setting a subtraction of a product of a predetermined weight and a constant comprising one of a vector constant and one-half the bit width of a bit range of one of the multiple, distinct computation nodes from a computational output of each node of the subset of the multiple, distinct computation nodes; and
    reconstructing the computation graph using the optimal graph component in a place of the suboptimal graph component.

2. The method according to claim 1, wherein
transforming the suboptimal graph component to the optimal graph component includes:
    removing the first activation function within the suboptimal graph component; and
    installing a second activation function in a place of the first activation function.

3. The method according to claim 2, wherein
transforming the suboptimal graph component to the optimal graph component further includes:
    increasing or decreasing a value of one or more biases associated with one or more weights of a matrix multiply accelerator of the mixed-signal integrated circuit based on attributes of the second activation function.

4. The method according to claim 1, wherein:
the suboptimal graph component includes two or more distinct computational branches, wherein each of the two or more distinct computational branches produces a distinct output of a distinct matrix multiply accelerator;
transforming the suboptimal graph component to the optimal graph component further includes:
    (1) merging network operations of each of the distinct matrix multiply accelerator of each of the two or more distinct computational branches into a single, composite computational branch;

(2) concatenating computational weights of the distinct matrix multiply accelerator of the two or more distinct computational branches; and (3) summing computational biases of the distinct matrix multiply accelerator of the two or more distinct computational branches.

5. The method according to claim 4, wherein
transforming the suboptimal graph component to the optimal graph component further includes:
removing the first activation function within the suboptimal graph component; and
installing a second activation function in a place of the first activation function.

6. The method according to claim 1, further comprising:
identifying the restricted data type input to a matrix multiply accelerator of the mixed-signal integrated circuit,
wherein transforming the suboptimal graph component to the optimal graph component further includes:
converting the restricted data type input to a suitable data type input to the matrix multiply accelerator by augmenting the suboptimal graph component with a second activation function that is applied to the restricted data type prior to an input to the matrix multiply accelerator.

7. The method according to claim 1, wherein
the computation graph comprises a computational flow of a neural network application in which each of the plurality of graphical nodes relates to a distinct network computational operation and each of the plurality of graphical edges relate to a dependency between a pair of distinct network computational operations.

8. The method according to claim 1, wherein
the optimal operation threshold comprises a minimum degree of precision of one or more computational outputs of the mixed-signal integrated circuit.

9. The method according to claim 1, wherein
the optimal operation threshold comprises a minimum level of computational performance of the mixed-signal integrated circuit.

10. The method according to claim 1, further comprising:
building the computation graph, by the compiler, includes translating the computation graph into an intermediate representation, wherein the intermediate representation comprises semantic data of the computation graph.

11. The method according to claim 1, further comprising:
identifying the restricted data type input to an analog linear transformation of the mixed-signal integrated circuit,
wherein transforming the suboptimal graph component to the optimal graph component further includes:
converting the restricted data type input to a suitable data type input to the analog linear transformation by augmenting the suboptimal graph component with a second activation function that is applied to the restricted data type prior to an input to the analog linear transformation.

12. The method according to claim 1, wherein
transforming the suboptimal graph component to the optimal graph component further includes:
augmenting a second activation function within branches of the subset of the multiple, distinct computation nodes; and
after a computation at each node of the subset of the multiple, distinct computation nodes, setting a subtraction of a product of a predetermined weight and a constant comprising one of a vector constant and one-half the bit width of a bit range of one of the multiple, distinct computation nodes from a computational output of each node of the subset of the multiple, distinct computation nodes.

13. The method according to claim 1, wherein
transforming the suboptimal graph component to the optimal graph component further includes:
augmenting, within a branch between the source node and each node of the subset of the multiple, distinct computation nodes, a predetermined adjustment value comprising one of a vector constant and one-half a bit width of a bit range of one of the multiple, distinct computation nodes based on attributes of the first activation function within the source computation node; and
after a computation at each node of the subset of the multiple, distinct computation nodes, setting a subtraction of a product of a predetermined weight and a constant comprising one of a vector constant and one-half the bit width of a bit range of one of the multiple, distinct computation nodes from a computational output of each node of the subset of the multiple, distinct computation nodes.

14. A method for implementing an operational transformation in a mixed-signal integrated circuit, the method comprising:
identifying a suboptimal graph component of a computation graph of a subject application or a subject program, wherein:
(i) the computation graph comprises a plurality of graphical nodes representing computational operations and a plurality of graphical edges representing data dependencies between the graphical nodes, and
(ii) the suboptimal graph component comprises a subset of the plurality of graphical nodes and the plurality of graphical edges that do not satisfy an optimal operation threshold, wherein the suboptimal graph component comprises a source computation node that computes a restricted data type output to multiple, distinct computation nodes, and wherein a subset of the multiple, distinct computation nodes have a data type restriction that limits an acceptance of the restricted data type output;
at compile time, selectively applying an optimizing transformation to the suboptimal graph component based on attributes of a first activation function within the suboptimal graph component, wherein the optimization transformation, when applied, transforms the suboptimal graph component to an optimal graph component that satisfies the optimal operation threshold, wherein transforming the suboptimal graph component to the optimal graph component includes:
augmenting a second activation function within branches of the subset of the multiple, distinct computation nodes; and
after a computation at each node of the subset of the multiple, distinct computation nodes, setting a subtraction of a product of a predetermined weight and a constant comprising one of a vector constant and one-half the bit width of a bit range of one of the multiple, distinct computation nodes from a computational output of each node of the subset of the multiple, distinct computation nodes; and
reconstructing the computation graph using the optimal graph component in a place of the suboptimal graph component.

15. The method according to claim 14, wherein
transforming the suboptimal graph component to the optimal graph component further includes:
within a branch between the source node and each node of the multiple, distinct computation nodes, setting a subtraction of a predetermined adjustment value comprising one of a vector constant and one-half a bit width of a bit range of one of the multiple, distinct computation nodes based on attributes of the first activation function within the source computation node; and
after a computation at each node of the subset of the multiple, distinct computation nodes, setting a subtraction of a product of a predetermined weight and a constant comprising one of a vector constant and one-half the bit width of a bit range of one of the multiple, distinct computation nodes from a computational output of each node of the subset of the multiple, distinct computation nodes.

16. The method according to claim 14, wherein
transforming the suboptimal graph component to the optimal graph component further includes:
augmenting, within a branch between the source node and each node of the subset of the multiple, distinct computation nodes, a predetermined adjustment value comprising one of a vector constant and one-half a bit width of a bit range of one of the multiple, distinct computation nodes based on attributes of the first activation function within the source computation node; and
after a computation at each node of the subset of the multiple, distinct computation nodes, setting a subtraction of a product of a predetermined weight and a constant comprising one of a vector constant and one-half the bit width of a bit range of one of the multiple, distinct computation nodes from a computational output of each node of the subset of the multiple, distinct computation nodes.

17. A method for implementing an operational transformation in a mixed-signal integrated circuit, the method comprising:
identifying a suboptimal graph component of a computation graph of a subject application or a subject program, wherein:
(i) the computation graph comprises a plurality of graphical nodes representing computational operations and a plurality of graphical edges representing data dependencies between the graphical nodes, and
(ii) the suboptimal graph component comprises a subset of the plurality of graphical nodes and the plurality of graphical edges that do not satisfy an optimal operation threshold, wherein the suboptimal graph component comprises a source computation node that computes a restricted data type output to multiple, distinct computation nodes, and wherein a subset of the multiple, distinct computation nodes have a data type restriction that limits an acceptance of the restricted data type output;
at compile time, selectively applying an optimizing transformation to the suboptimal graph component based on attributes of a first activation function within the suboptimal graph component, wherein the optimization transformation, when applied, transforms the suboptimal graph component to an optimal graph component that satisfies the optimal operation threshold, wherein transforming the suboptimal graph component to the optimal graph component includes:
augmenting, within a branch between the source node and each node of the subset of the multiple, distinct computation nodes, a predetermined adjustment value comprising one of a vector constant and one-half a bit width of a bit range of one of the multiple, distinct computation nodes based on attributes of the first activation function within the source computation node; and
after a computation at each node of the subset of the multiple, distinct computation nodes, setting a subtraction of a product of a predetermined weight and a constant comprising one of a vector constant and one-half the bit width of the bit range of one of the multiple, distinct computation nodes from a computational output of each node of the subset of the multiple, distinct computation nodes; and
reconstructing the computation graph using the optimal graph component in a place of the suboptimal graph component.

18. The method according to claim 17, wherein
transforming the suboptimal graph component to the optimal graph component further includes:
within a branch between the source node and each node of the multiple, distinct computation nodes, setting a subtraction of a predetermined adjustment value comprising one of a vector constant and one-half a bit width of a bit range of one of the multiple, distinct computation nodes based on attributes of the first activation function within the source computation node; and
after a computation at each node of the subset of the multiple, distinct computation nodes, setting a subtraction of a product of a predetermined weight and a constant comprising one of a vector constant and one-half the bit width of a bit range of one of the multiple, distinct computation nodes from a computational output of each node of the subset of the multiple, distinct computation nodes.

19. The method according to claim 17, wherein
transforming the suboptimal graph component to the optimal graph component further includes:
augmenting a second activation function within branches of the subset of the multiple, distinct computation nodes; and
after a computation at each node of the subset of the multiple, distinct computation nodes, setting a subtraction of a product of a predetermined weight and a constant comprising one of a vector constant and one-half the bit width of a bit range of one of the multiple, distinct computation nodes from a computational output of each node of the subset of the multiple, distinct computation nodes.

* * * * *